(12) United States Patent
Liang et al.

(10) Patent No.: US 11,003,021 B1
(45) Date of Patent: May 11, 2021

(54) DISPLAY MODULE AND METHOD OF MANUFACTURING THE SAME, AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Fei Liang, Beijing (CN); Peng Zhong, Beijing (CN); Xiuyun Chen, Beijing (CN); Lingyu Sun, Beijing (CN); Liyu Fang, Beijing (CN); Jingjun Du, Beijing (CN); Tingxiu Hou, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/817,290

(22) Filed: Mar. 12, 2020

(30) Foreign Application Priority Data

Oct. 17, 2019 (CN) .......................... 201910988956.X

(51) Int. Cl.
*G02F 1/13357* (2006.01)
*F21V 8/00* (2006.01)

(52) U.S. Cl.
CPC ....... *G02F 1/133606* (2013.01); *G02B 6/004* (2013.01); *G02B 6/0078* (2013.01)

(58) Field of Classification Search
CPC .................................................. G02F 1/133606
See application file for complete search history.

(56) References Cited

U.S. PATENT DOCUMENTS

| 2007/0279551 | A1* | 12/2007 | Umebayashi | G02B 6/0053 |
| | | | | 349/65 |
| 2008/0084709 | A1* | 4/2008 | Li | G02B 6/0036 |
| | | | | 362/616 |
| 2009/0296193 | A1* | 12/2009 | Bita | G02B 6/005 |
| | | | | 359/291 |
| 2011/0242841 | A1* | 10/2011 | Lin | G02B 6/0083 |
| | | | | 362/606 |
| 2017/0351019 | A1* | 12/2017 | Kadowaki | G02B 6/0083 |
| 2018/0031875 | A1* | 2/2018 | Qin | G02B 6/0036 |
| 2019/0293858 | A1* | 9/2019 | Woodgate | G02B 6/0055 |

* cited by examiner

*Primary Examiner* — Edmond C Lau
(74) *Attorney, Agent, or Firm* — Kinney & Lange, P.A.

(57) ABSTRACT

Embodiments of the present disclosure provide a display module and a method of manufacturing the same, and a display device. In one embodiment, a display module includes a display panel and a light-emitting module. The light-emitting module includes: a light source configured to emit light; a light guide structure configured to form a total reflection propagation of the light emitted by the light source therein; and a light extraction structure disposed between the display panel and the light guide structure, and configured to introduce the light propagating in the light guide structure into the display panel.

16 Claims, 9 Drawing Sheets

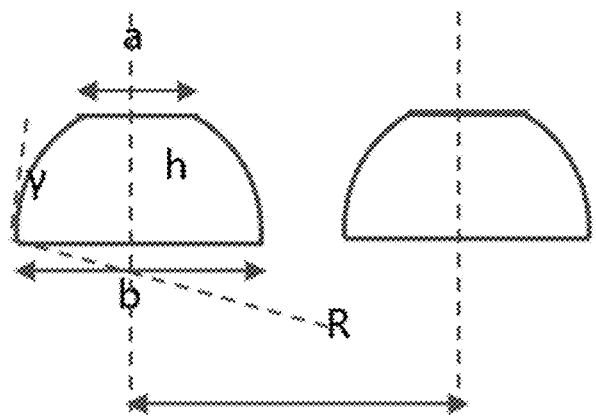
FIG. 5
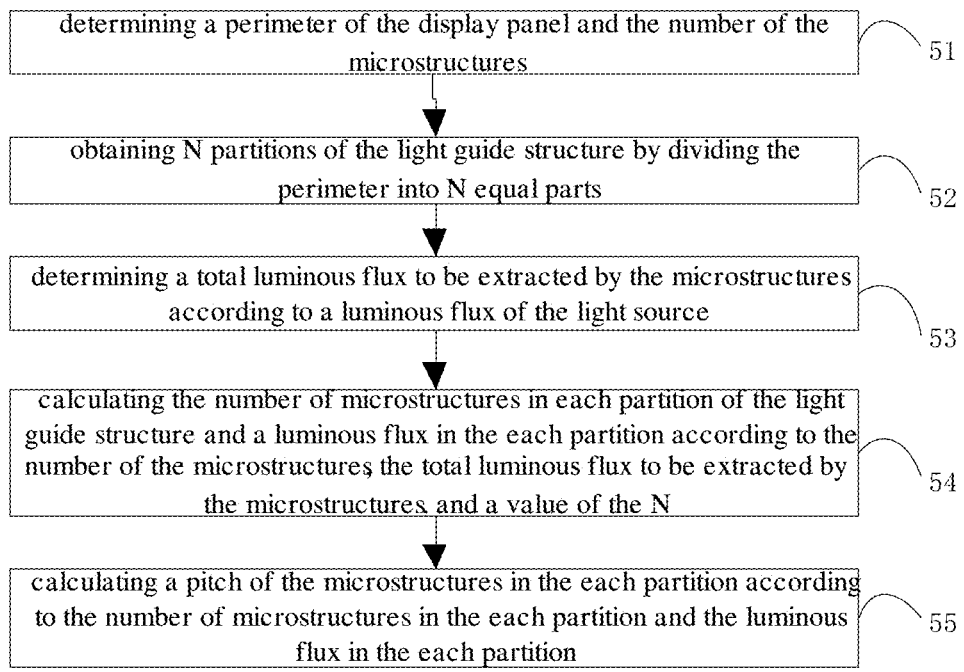
FIG. 6
| micro-structure | scheme I | scheme II | scheme III | scheme IV | scheme V | scheme VI |
|---|---|---|---|---|---|---|
| sectional view | | | | | | |
| top view | | | | | | |
FIG. 7A

DISPLAY MODULE AND METHOD OF MANUFACTURING THE SAME, AND DISPLAY DEVICE

CROSS-REFERENCE TO RELATED APPLICATION

This application claims priority to Chinese Patent Application No. 201910988956.X filed on Oct. 17, 2019 in the State Intellectual Property Office of China, the disclosure of which is hereby incorporated by reference in its entirety.

TECHNICAL FIELD

The present disclosure generally relates to the field of display technology, and particularly, to a display module and a method of manufacturing the same, and a display device.

BACKGROUND

At present, transparent display is widely used in the fields of exhibition stands, home appliances and special consumer goods. The display effect of the transparent display is highly dependent on external light, so the auxiliary light source is essential. For different shapes of transparent display, the traditional light guide structure usually has the problems of uneven brightness and poor generality.

SUMMARY

According to an aspect of the present disclosure, there is provided a display module. The display module comprises a display panel and a light-emitting module. The light-emitting module comprises: a light source configured to emit light; a light guide structure configured to form a total reflection propagation of the light emitted by the light source therein; and a light extraction structure disposed between the display panel and the light guide structure, and configured to introduce the light propagating in the light guide structure into the display panel.

In one embodiment, the light extraction structure comprises a plurality of microstructures arranged along a propagation direction of the light in the light guide structure, and a contact area between each microstructure and the light guide structure is smaller than a contact area between the each microstructure and the display panel.

In one embodiment, along the propagation direction of the light in the light guide structure, a distribution density of the microstructures increases as a distance of the microstructures from the light source increases.

In one embodiment, the distribution density of the microstructures meets parameter conditions obtained by the following method steps of:

determining a perimeter of the display panel and the number of the microstructures;

obtaining N partitions of the light guide structure by dividing the perimeter into N equal parts;

determining a total luminous flux to be extracted by the microstructures according to a luminous flux of the light source;

calculating the number of microstructures in each partition of the light guide structure and a luminous flux in the each partition according to the number of the microstructures, the total luminous flux to be extracted by the microstructures, and a value of the N; and calculating a pitch of the microstructures in the each partition according to the number of microstructures in the each partition and the luminous flux in the each partition.

In one embodiment, a shape of each microstructure comprises at least one of the followings: a cone, a truncated cone, a spherical segment, a spherical table, an ellipsoidal segment, an ellipsoidal table, or a hyperboloid body truncated at any point by a plane parallel to a base surface.

In one embodiment, the light guide structure surrounds an outer edge of the display panel.

In one embodiment, along a light exit direction of the display panel, a height of the light guide structure is smaller than a thickness of the display panel.

In one embodiment, along the light exit direction of the display panel, a width of a contact surface between the light extraction structure and the light guide structure is the same as the height of the light guide structure, and a width of a contact surface between the light extraction structure and the display panel is the same as the thickness of the display panel.

In one embodiment, the light guide structure comprises a first end provided with the light source, and a second end provided with a reflective structure at an end face thereof.

In one embodiment, a light exit surface is formed at a part of the light guide structure facing the display panel, and a light reflecting layer is formed at a part of the light guide structure not facing the display panel.

In one embodiment, a wedge-shaped light incident structure is provided between the light source and the first end.

In one embodiment, the light guide structure is made of a flexible material.

In one embodiment, a surface of the light extraction structure in contact with the display panel is bonded to the display panel by a bonding adhesive.

In one embodiment, refractive indices of the light guide structure, the light extraction structure and the bonding adhesive are substantially equal, or a difference between the refractive indices of any two of the light guide structure, the light extraction structure and the bonding adhesive is within a preset error range.

In one embodiment, the display module is applied to a transparent display.

In one embodiment, the display module is applied to a polymer network liquid crystal transparent display, and a side surface of each microstructure is configured such that reflection angles formed by parallel light incident from any angle on the each microstructure at at least two parts of the side surface of the each microstructure are different.

According to another aspect of the present disclosure, there is provided a display device comprising the display module according to any one of the above embodiments.

According to yet another aspect of the present disclosure, there is provided a method of manufacturing a display module. The method comprises: selecting a light guide structure substrate; forming a light extraction structure on a surface of the light guide structure substrate; applying a bonding adhesive on the light extraction structure; bonding the light extraction structure to which the bonding adhesive is applied to a display panel; and providing a light source at one end of the light guide structure substrate.

In one embodiment, the method further comprises: providing a reflective structure at an end face of the other end of the light guide structure substrate; and/or forming a light exit surface at a part of the light guide structure substrate facing the display panel, and forming a light reflecting layer at a part of the light guide structure substrate not facing the display panel.

BRIEF DESCRIPTION OF THE DRAWINGS

In order to more clearly illustrate the technical solutions of the embodiments of the present disclosure, the drawings of the embodiments will be briefly introduced below. Obviously, the drawings in the following description only relate to some embodiments of the present disclosure, rather than limiting the present disclosure.

FIG. 5 is a schematic view showing a dimension of one microstructure according to the embodiment of the present disclosure;

FIG. 6 is a schematic flow diagram showing how to determine a distribution density of the microstructures in the light guide structure according to the embodiment of the present disclosure;

FIG. 7A is a schematic view showing examples of one microstructure according to embodiments of the present disclosure;

DETAILED DESCRIPTION OF THE EMBODIMENTS

To make the objects, technical solutions, and advantages of the embodiments of the present disclosure more clear, the technical solutions of the embodiments of the present disclosure will be described clearly and completely in combination with the drawings of the embodiments of the present disclosure. Obviously, the described embodiments are some of the embodiments of the present disclosure, but not all the embodiments. Based on the described embodiments of the present disclosure, all other embodiments obtained by those skilled in the art without creative labor shall fall within the protection scope of the present disclosure.

Unless otherwise defined, the technical or scientific terms used in the present disclosure shall have the ordinary meanings understood by those having ordinary skills in the field to which the present disclosure belongs. The words "first", "second", and the like used in this disclosure do not indicate any order, quantity, or importance, but are only used to distinguish different components. Similarly, the words "a", "an", or "the" and the like do not indicate a limit on quantity, but rather indicate that there is at least one. The words "comprise", "include" and the like mean that the element or item appearing before the word covers the element or item appearing after the word and the equivalent thereof without excluding other elements or items. The words "connect" or "connected" and the like are not limited to physical or mechanical connections, but may include electrical connections, whether direct or indirect. "Up", "down", "left", "right", etc. are only used to indicate the relative positional relationship. Once the absolute position of the described object changes, the relative positional relationship may also change accordingly.

Figure 1:
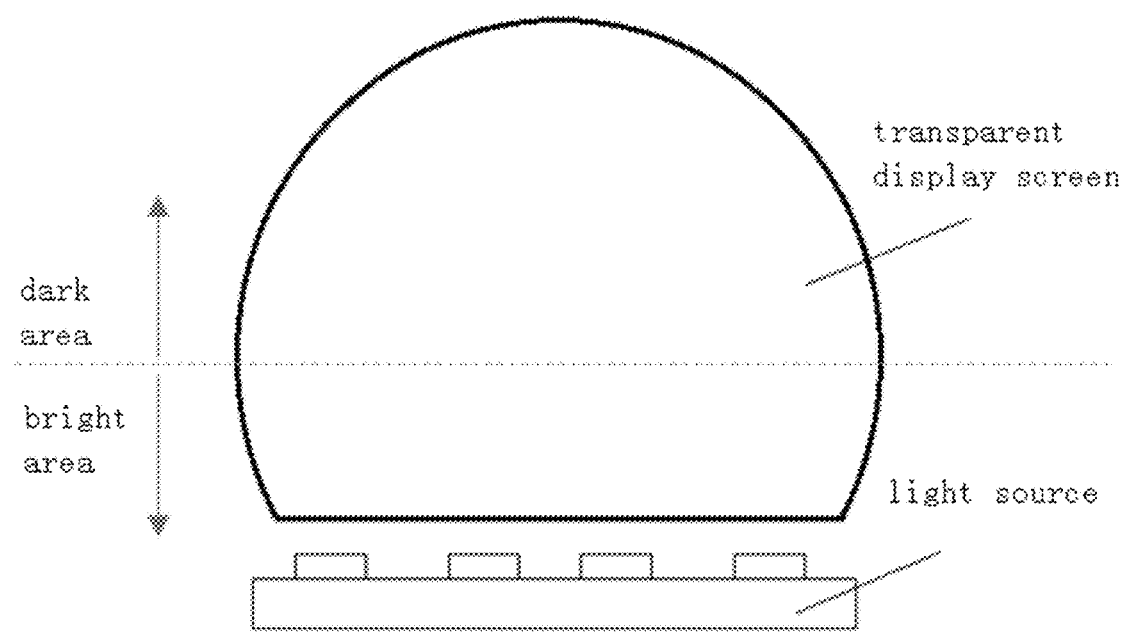
FIG. 1 is a schematic view showing a transparent display in related art.

FIG. 1 is a schematic view showing a transparent display in related art.

The transparent display shown in FIG. 1 usually uses a light emitting diode light bar (LED Bar) as its auxiliary light source. The light emitted by the auxiliary light source directly enters the interior of the transparent display screen. This solution has at least the following disadvantages.

First, brightness is uneven. Due to the large propagation loss and short transmission distance of light inside the display screen, the side near the light source is a bright area, and the side far from the light source is a dark area where the display content is almost invisible. The entire screen is unevenly lit and the display effect is poor.

Second, there is hotspot issue. Due to the poor light-guiding effect of the display screen, the light scattering effect within the screen is poor, resulting in severe hotspot phenomenon.

Third, the versatility is poor. The light source in related art is a light bar, and a special-shaped display screen cannot be realized.

Figure 2:
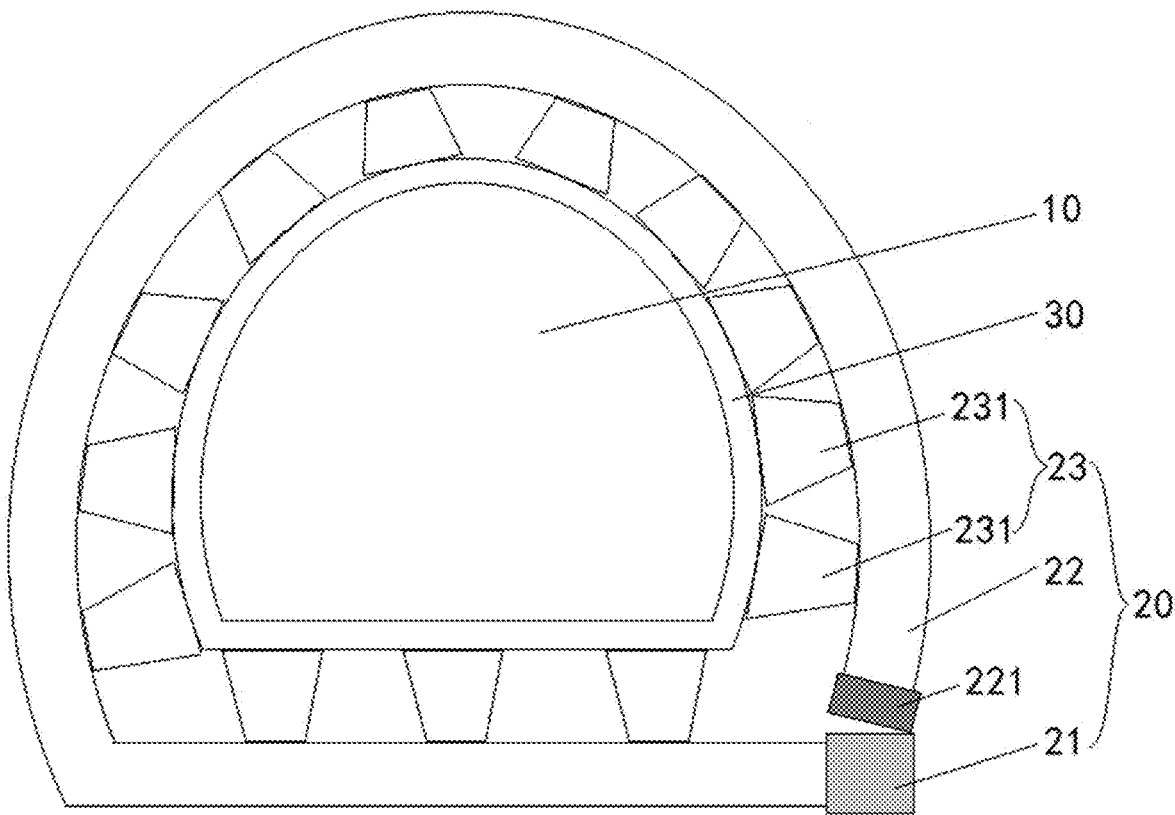
FIG. 2 is a schematic view showing a structure of a transparent display module according to an embodiment of the present disclosure.

FIG. 2 is a schematic view showing a structure of a transparent display module according to an embodiment of the present disclosure. The display module can solve the above-mentioned technical problems to a certain extent.

As shown in FIG. 2, the display module comprises: a display panel 10 and a light-emitting module 20. The light-emitting module 20 comprises a light source 21 configured to emit light, a light guide structure 22 and a light extraction structure 23. The light guide structure 22 is configured to form a total reflection propagation of the light emitted by the light source 21 therein. The light extraction structure 23 is disposed between the display panel 10 and the light guide structure 20, and is configured to introduce the light propagating in the light guide structure 22 into the display panel 10.

In one embodiment, the greater the number of contact areas of the light extraction structure 23 and the light guide structure 22, the denser the contact areas are, the greater the amount of the light output is.

Figure 3:
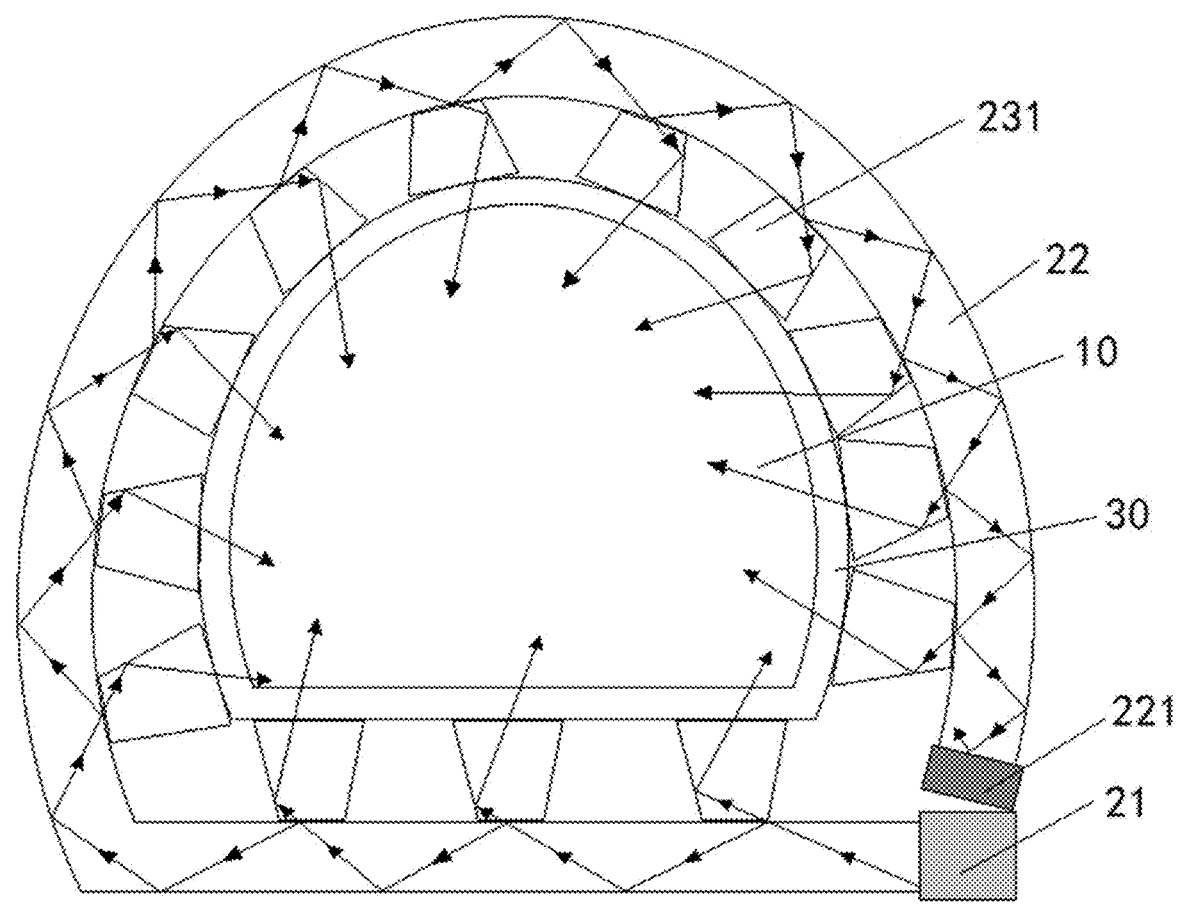
FIG. 3 is a schematic view showing an optical path of the transparent display module according to the embodiment of the present disclosure.

FIG. 3 is a schematic view showing an optical path of the transparent display module according to the embodiment of the present disclosure. The arrowed lines indicate the light's propagation path, and the arrows indicate the light's propagation direction. As shown in FIG. 3, the light emitted by the light source 21 forms a total reflection propagation in the light guide structure 22. At the same time, when the light reaches the contact area between the light extraction structure 23 and the light guide structure 22, the light extraction structure 23 affects the total reflection of light in the light guide structure 22, so that the light is introduced into the display panel 10 by the light extraction structure 23. Liquid crystal molecules in the display panel 10 have a scattering effect, and the light is displayed in the display panel 10 through the scattering principle, so as to be viewed by the observer.

It can be seen from the above embodiment that, the display module provided by the embodiments of the present disclosure allows the light emitted by the light source to be totally reflected in the light guide structure through the design of the light guide structure, and introduces the light into the display panel by providing the light extraction structure between the light guide structure and the display panel, so as to achieve the display. Because the light extraction structure is provided between the light guide structure and the display panel, whatever the shape of the display panel presents, positioning of the light extraction structure can be adjusted to introduce light into the display panel at any parts of the light guide structure, so as to achieve uniform lighting in the display panel, but also allows the display panel to be made into any shape, which enriches the shape design of the display panel.

In an embodiment, as shown in FIG. 2 and FIG. 3, the light extraction structure 23 includes a plurality of microstructures 231 arranged along a propagation direction of the light in the light guide structure 22. The contact area between each microstructure 231 and the light guide structure 22 is smaller than the contact area between this microstructure 231 and the display panel 10. Here, the propagation direction of the light in the light guide structure 22 mainly refers to the overall propagation direction of the light in the light guide structure, and the direction is basically consistent with the extending direction of the light guide structure.

In this embodiment, the contact area between the microstructure 231 and the light guide structure 22 is relatively small, so that the microstructure 231 can be in contact with any part of the light guide structure 22 (even in the bent part of the light guide structure 22, the microstructure 231 can also make good contact with the light guide structure 22), and can guide the light from this part of the light guide structure 22 into the display panel 10. At the same time, the contact area between the microstructure 231 and the display panel 10 is relatively large, so that the light from the light guide structure 22 can be introduced into the display panel 10 as uniformly as possible. In addition, through this kind of microstructure design with one large end and one small end, the microstructures can be arranged one-dimensionally along the light propagation direction, and under the premise of satisfying the luminous flux, the structure is relatively simple, and there is no need to adopt a two-dimensional arrangement manner of light extraction points.

It should be noted that although the relative size of the microstructure 231 to the display panel 10 and the light guide structure 22 shown in FIG. 2 is relatively large, this is only for the convenience of illustration and does not represent the actual size ratio. It can be known that according to the description to the microstructure 231 in the embodiment of the present disclosure, the size of the microstructure 231 should be relatively small, so that it can contact any part of the light guide structure 22.

It should also be noted that, in addition to the microstructure, the form of the light extraction structure can also be in other manners, for example, the form of setting the light extraction points on the light guide structure, and so on. Therefore, the protection scope of the present disclosure should not be limited to the above embodiments.

Figure 4:
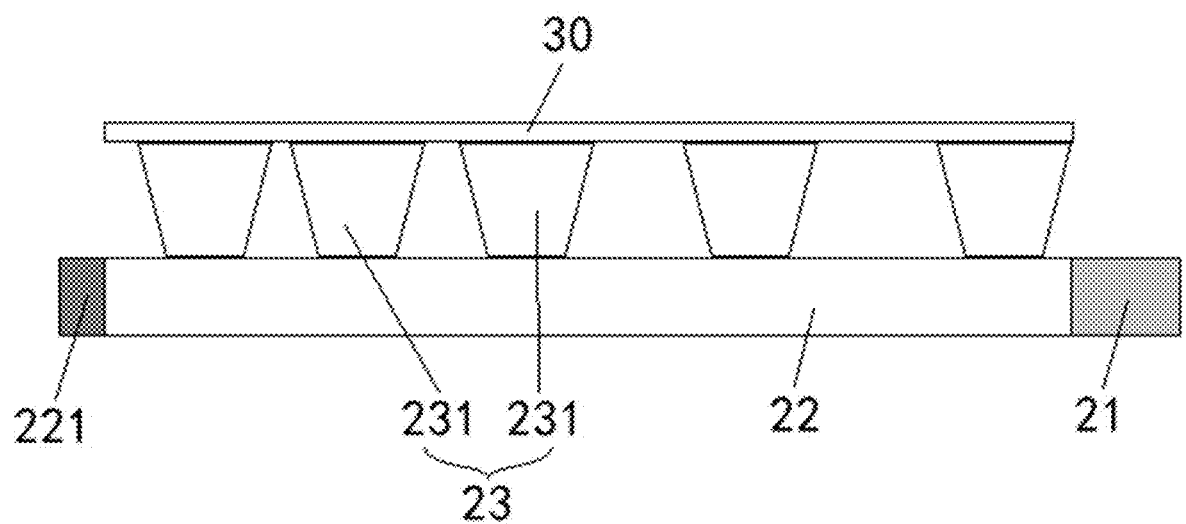
FIG. 4 is a schematic view showing a positional relationship between a light guide structure and microstructures when the light guide structure is stretched into a planar configuration, according to the embodiment of the present disclosure.

In an embodiment, as shown in FIG. 2 and FIG. 3, along the propagation direction of the light in the light guide structure 22, a distribution density of the microstructures 231 increases as a distance of the microstructures 231 from the light source 21 increases. FIG. 4 is a schematic view showing a positional relationship between the light guide structure 22 and the microstructures 231 when the light guide structure 22 is stretched into a planar configuration. It can be seen that the light is emitted from the light source 21, and along the propagation direction of the light in the light guide structure 22, as the distance between the microstructure 231 and the light source 21 increases, the distribution density of the microstructures 231 gradually increases. In this way, the number of microstructures 231 distributed in the part with higher light intensity (position near the light source 21) is less because there is sufficient light, and the number of microstructures 231 distributed in the part with lower light intensity (position away from the light source 21) is greater because there is relatively little light. As a result, the light that is finally introduced into the display panel 10 from various positions is more uniform, thereby improving the overall uniformity of the display effect.

In an embodiment, FIG. 6 is a schematic flow diagram showing how to determine a distribution density of the microstructures in the light guide structure according to the embodiment of the present disclosure. That is to say, as shown in FIG. 6, the distribution density of the microstructures 231 meets parameter conditions obtained by the following method steps of:

determining a perimeter of the display panel 10 and the number of the microstructures 231;

obtaining N partitions of the light guide structure 22 by dividing the perimeter into N equal parts;

determining a total luminous flux to be extracted by the microstructures 231 according to a luminous flux of the light source 21;

calculating the number of microstructures 231 in each partition of the light guide structure 22 and a luminous flux in the each partition according to the number of the microstructures 231, the total luminous flux to be extracted by the microstructures 231, and value of the N; and calculating a pitch of the microstructures in the each partition according to the number of microstructures in the each partition and the luminous flux in the each partition.

For example, taking the scheme II shown in FIG. 7A as an example, as shown in FIG. 5, when the dimensions in the following Table 1 are used, extraction of the light in the light guide structure 22 by the microstructure 231 refers to the following method.

Assuming the perimeter of the display panel 10 is A, the distribution length of the microstructures 231 is A. The perimeter is divided into N equal parts, and the goal is that the total light output of each part is as equal as possible. In one embodiment, the number of original partitions is 5~20.

Taking the total luminous flux of the light source 21 being 38 lm and the total number of the microstructures 231 being 300 as an example, the data of the luminous flux of the output light extracted by every 10 microstructures 231 is collected as shown in Table 2 below (for example, the total luminous flux of the output light extracted by the 1st to 10th microstructures 231 is 1.329 lm, and the total luminous flux of the output light extracted by the 11th to the 20th microstructures 231 is 1.301 lm, . . . ). The total luminous flux of the output light extracted by the 300 microstructures 231 is approximately 32 lm.

If the number of partitions N is 9, the luminous flux of each partition is about 32 lm/9=3.5 lm. According to this, the number of microstructures in each partition is calculated.

When the perimeter A is 54.7 mm, the pitches among these partitions are approximately 225 μm, 217 μm, 203 μm, 190 μm, 174 μm, 169 μm, 164 μm, 160 μm, 164 μm.

TABLE 1

Dimensions of a Microstructure shown in Scheme II shown in FIG. 7

| Item | Dimensions |
| --- | --- |
| Short Side a/μm | 7.03 |
| Long Side b/μm | 18 |
| Height h/μm | 11.4 |
| Curve Arc Radius R/μm | 19.04 |
| Bevel Angle γ/° | 84.02 |

TABLE 2

Statistics on Luminous Flux Extracted by Microstructures

| Number of microstructures | 0~10 | 11~20 | 21~30 | 31~40 | 41~50 | 51~60 | 61~70 | 71~80 | 81~90 | 91~100 |
| --- | --- | --- | --- | --- | --- | --- | --- | --- | --- | --- |
| Total luminous flux of output light (unit: lm) | 1.329 | 1.301 | 1.273 | 1.248 | 1.223 | 1.199 | 1.176 | 1.155 | 1.135 | 1.115 |
| Number of microstructures | 101~110 | 111~120 | 121~130 | 131~140 | 141~150 | 151~160 | 161~170 | 171~180 | 181~190 | 191~200 |
| Total luminous flux of output light (unit: lm) | 1.097 | 1.080 | 1.063 | 1.048 | 1.034 | 1.020 | 1.008 | 0.996 | 0.986 | 0.976 |
| Number of microstructures | 201~210 | 211~220 | 221~230 | 231~240 | 241~250 | 251~260 | 261~270 | 271~280 | 281~290 | 291~300 |
| Total luminous flux of output light (unit: lm) | 0.967 | 0.960 | 0.953 | 0.947 | 0.941 | 0.937 | 0.934 | 0.931 | 0.929 | 0.928 |

Using software Optisworks for simulation, the luminous flux extraction rate of all the microstructures 231 at their light exit surfaces in the light extraction structure 23 can reach 85%. In addition, according to the simulated configuration, the output light distribution of all the microstructures 231 in the light extraction structure 23 has good uniformity and no beam phenomenon. For optimization, the number of microstructures in the partition can be fine-adjusted.

It should be noted that if the light utilization rate needs to be improved, the total number of the microstructures 231 can be appropriately increased. In this model, when the number of the microstructures 231 is 400, the light extraction rate can reach 96%.

For example, as shown in FIG. 7A, a shape of the microstructure 231 comprises at least one of the following: a cone (Scheme IV), a truncated cone (Scheme I), a spherical segment or an ellipsoidal segment (Scheme V), a spherical table or an ellipsoidal table (Scheme II), or a hyperboloid body truncated at any point by a plane parallel to a base surface (Scheme VI). In addition, it may also be a specific shape, as shown in Scheme III.

In one embodiment, for different types of transparent display screens, different microstructure shapes are used because of the requirements of the display principle.

Figure 7B:
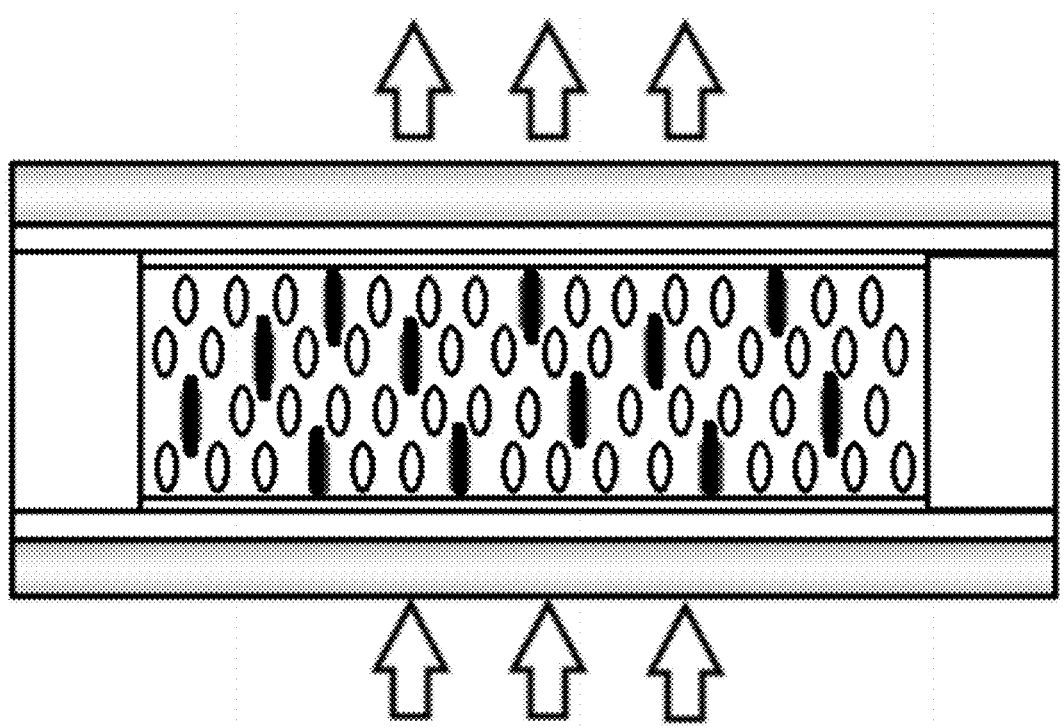
FIG. 7B is a schematic diagram showing a dye liquid crystal transparent display screen in a transmissive state according to an embodiment of the present disclosure.
Figure 7C:
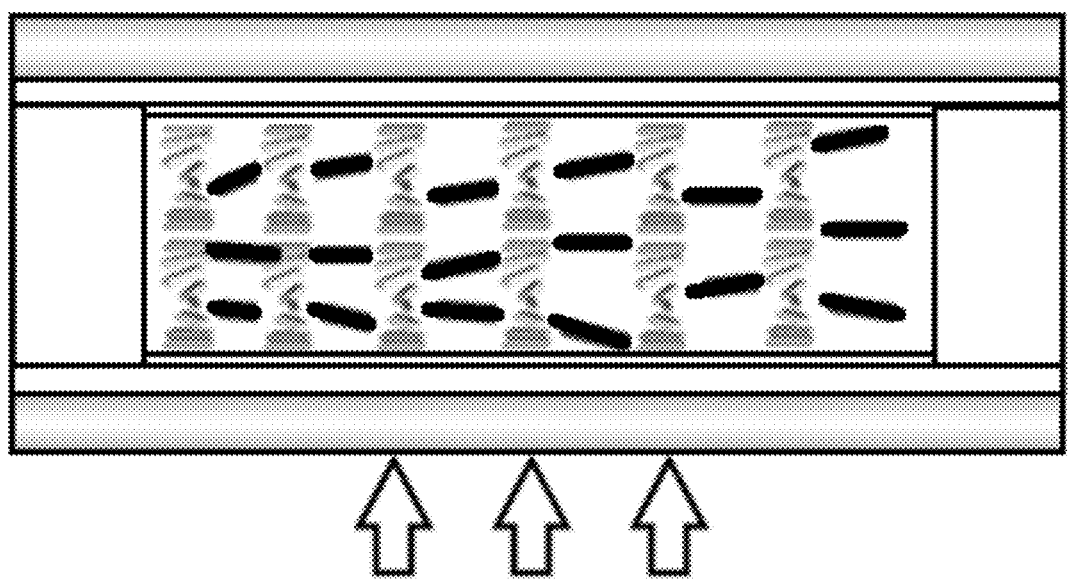
FIG. 7C is a schematic diagram showing a dye liquid crystal transparent display screen in an absorption state according to the embodiment of the present disclosure.

For example, for the dye liquid crystal transparent display screen, because of its low dependence on the light angle of the auxiliary light source, the microstructure scheme can be selected from any one of schemes I to VI in FIG. 7A. As shown in FIGS. 7B and 7C, the dye liquid crystal transparent display screen is switchable between a transmissive state (FIG. 7B) and an absorption state (FIG. 7C). Due to low dependence on the light angle of the auxiliary light source, the light is more easily absorbed at the dye liquid crystal molecules, and it becomes a black state. The light angles adjusted by the microstructure schemes I to VI (see FIG. 7A) can all meet the requirements of the auxiliary light source.

Figure 7D:
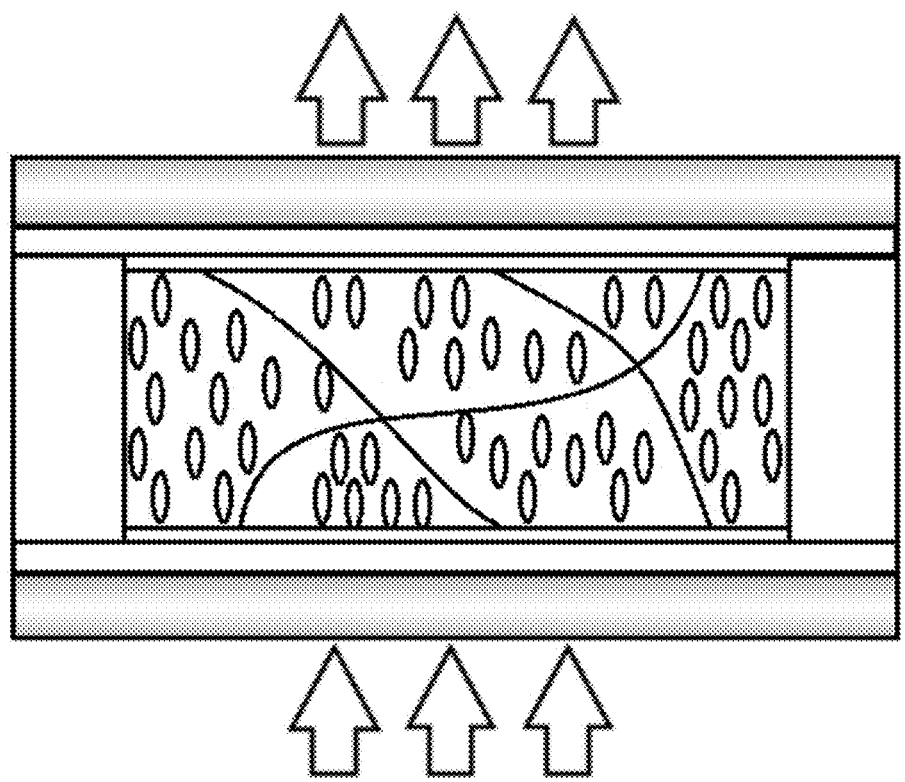
FIG. 7D is a schematic diagram showing a polymer network liquid crystal transparent display screen in a transmissive state according to an embodiment of the present disclosure.
Figure 7E:
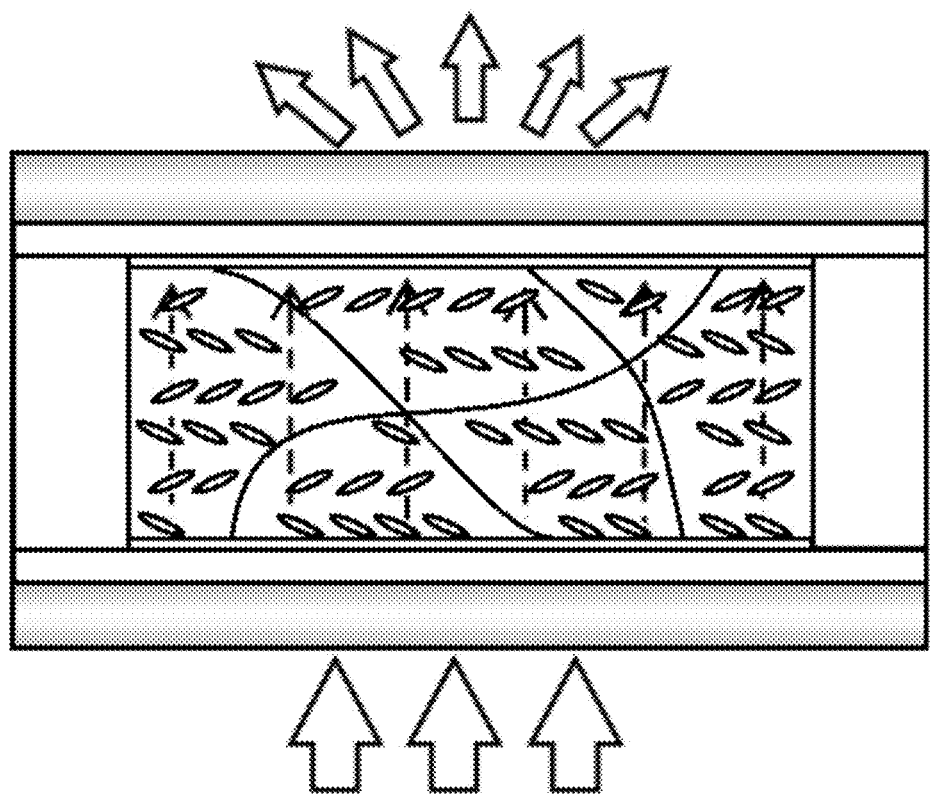
FIG. 7E is a schematic diagram showing a polymer network liquid crystal transparent display screen in a scattering state according to the embodiment of the present disclosure.

For example, for the polymer network liquid crystal (PNLC) transparent display screen, because of its high dependence on the light angle of the auxiliary light source, it requires a microstructure to match the light path so that the angle of light entering the display panel can be adjusted. Therefore, schemes II, III, V and VI in FIG. 7 can be used for the microstructure. As shown in FIGS. 7D and 7E, the polymer network liquid crystal transparent display screen is switchable between a transmissive state (FIG. 7D) and a scattering state (FIG. 7E), which has a higher dependence on the light angle of the auxiliary light source. The larger the incident angle, the stronger the scattering effect and the higher the contrast ratio (CR). For the microstructure, schemes II, III, V and VI in FIG. 7A can be used to adjust the light to be at a large incident angle.

Figure 7F:
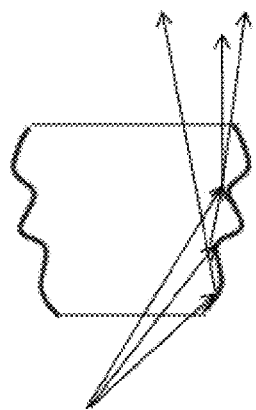
FIG. 7F is a schematic diagram showing a light path principle of one microstructure according to an embodiment of the present disclosure.
Figure 7G:
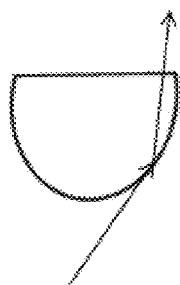
FIG. 7G is a schematic diagram showing a light path principle of another microstructure according to an embodiment of the present disclosure.
Figure 7H:
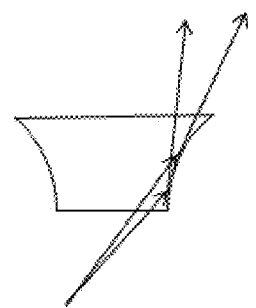
FIG. 7H is a schematic diagram showing a light path principle of still another microstructure according to an embodiment of the present disclosure.

In an embodiment, referring to FIGS. 7F to 7H, if the display module is applied to a polymer network liquid crystal transparent display, the side surface of the microstructure satisfies that reflection angles formed by parallel light incident from any angle on the microstructure at at least two parts of the side surface of the microstructure are different. Because such a microstructure makes the slopes of at least two parts of the side surface of the microstructure different, the exit angle of the parallel light incident on the microstructure when it exits from the microstructure into the display panel can be different, so that such a principle can be used to adjust the angle of light incident into the display panel to meet the light angle required by the polymer network liquid crystal transparent display screen.

In this way, according to the characteristics of liquid crystal molecules of different display screens, different microstructures are used to ensure the required luminous flux for display.

In an embodiment, as shown in FIG. 2, the light guide structure 22 surrounds an outer edge of the display panel 10. In this way, light can enter the display panel 10 from various angles, thereby improving display uniformity.

Figure 8:
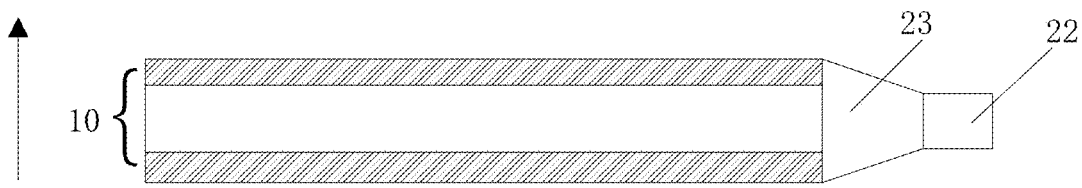
FIG. 8 is a schematic cross-sectional view showing a display module along a light exit direction of a display panel, according to an embodiment of the present disclosure.

In an embodiment, as shown in FIG. 8, along a light exit direction of the display panel 10 (the direction indicated by the arrow in FIG. 8), a height of the light guide structure 22 is smaller than a thickness of the display panel 10, ensuring that all the light propagating in the light guide structure 22 can enter the display panel 10 to prevent light leakage.

In an embodiment, FIG. 8 is a schematic cross-sectional view showing a display module along the light exit direction of the display panel, according to the embodiment of the present disclosure. As shown in FIG. 8, along the light exit direction of the display panel 10 (the direction indicated by the arrow in FIG. 8), a width of the contact surface between the light extraction structure 23 and the light guide structure 22 is the same as the height of the light guide structure 22, and a width of the contact surface between the light extraction structure 23 and the display panel 10 is the same as the thickness of the display panel 10. The width of the contact surface here refers to the length dimension of the contact surface in the light exit direction of the display panel 10. Regardless of the shape of the contact surface, the width here is the length dimension of the contact surface in the light exit direction of the display panel 10. This design ensures that the light extraction structure 23 can take light from the light guide structure as much as possible and introduce the light to the display panel 10 as much as possible, preventing light leakage while ensuring sufficient light.

In an embodiment, as shown in FIG. 2, the light guide structure 22 comprises a first end and a second end, the first end is provided with the light source 21, and a reflective structure 221 is provided at an end face of the second end so that when the light reaches the second end of the light guide structure 22, the light can be reflected by the reflective structure 221 (as shown in FIG. 3) and continue to propagate in the light guide structure 22, improving light utilization. At the same time, because the light source 21 is provided at one end of the light guide structure 22, the display module reduces the risk of hotspot. In an embodiment, the reflective structure 221 may be implemented by attaching a reflective sheet or spraying a reflective material as needed.

It should be noted that the reflective structure 221 is not an indispensable structure, and may be added or removed according to requirements, which does not limit the protection scope of the present disclosure.

Figure 9:
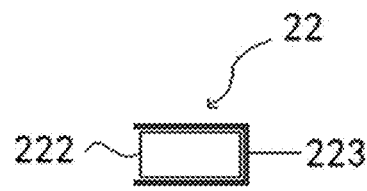
FIG. 9 is a schematic cross-sectional view showing a light guide structure along a light exit direction of a display panel, according to an embodiment of the present disclosure.
Figure 10A:
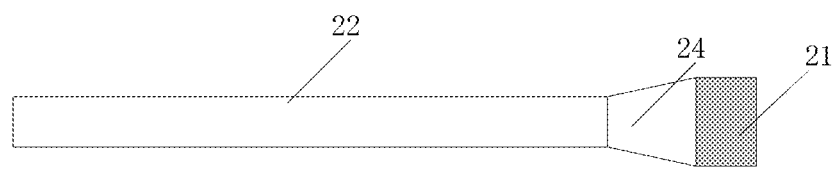
FIG. 10A is a schematic view showing an example in which a wedge-shaped light incident structure is provided between the light guide structure and the light source, according to an embodiment of the present disclosure.
Figure 10B:
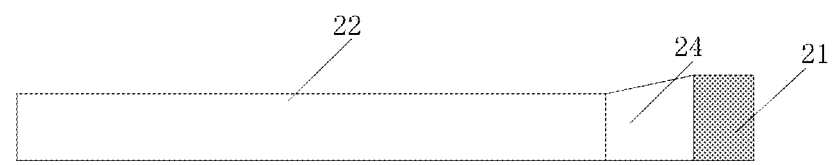
FIG. 10B is a schematic view showing another example in which the wedge-shaped light incident structure is provided between the light guide structure and the light source, according to the embodiment of the present disclosure.
Figure 10C:
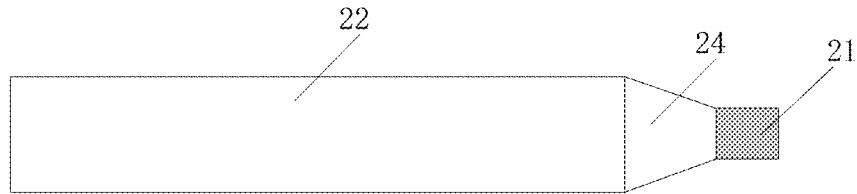
FIG. 10C is a schematic view showing still another example in which the wedge-shaped light incident structure is provided between the light guide structure and the light source, according to the embodiment of the present disclosure.
Figure 10D:
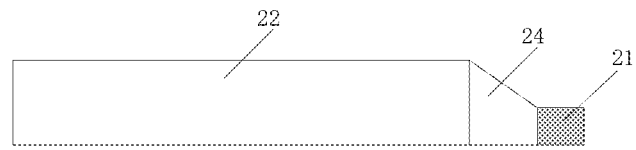
FIG. 10D is a schematic view showing yet another example in which the wedge-shaped light incident structure is provided between the light guide structure and the light source, according to the embodiment of the present disclosure.

In an embodiment, FIG. 9 is a schematic cross-sectional view showing a light guide structure along a light exit direction of a display panel, according to an embodiment of the present disclosure. As shown in FIG. 9, the light guide structure 22 includes a light exit surface 222 formed at a part of the light guide structure 22 facing the display panel 10, and a light reflecting layer 223 formed at a part of the light guide structure 22 not facing the display panel 10, so that light is concentrated to the light exit surface 222 as much as possible through the light reflecting layer 223 to exit, thereby improving light utilization.

In an embodiment, the light source 21 can be selected according to the requirement of the total brightness. At the same time, when the height of the light emitting surface of the light source 21 and the thickness of the light guide structure 22 are not equal, a wedge-shaped light incident structure 24 may be provided between the light source 21 and the first end of the light guide structure 22 to match the light guide structures 22 with different thicknesses. For example, a wedge-shaped light incident structure 24 similar to that shown in FIGS. 10A to 10D may be designed to achieve matching between the light source 21 and the light guide structure 22. The viewing angles of FIGS. 10A to 10D refer to the viewing angle of FIG. 4, that is, the light guide structure 22 in FIGS. 10A to 10D is stretched into a planar configuration.

In an embodiment, material of the light guide structure 22 is a flexible material. For example, a flexible polycarbonate material (PC) with a thickness of 100 μm is selected to meet the needs of display screens of various shapes.

In an embodiment, a surface of the light extraction structure 23 in contact with the display panel 10 is bonded to the display panel by a bonding adhesive 30. For example, the bonding adhesive is an optical transparent adhesive (OCA) or an optical liquid adhesive (OCR). In an embodiment, refractive indexes of the light guide structure 22, the light extraction structure 23, and the bonding adhesive 30 are substantially equal, or a difference between the refractive indices of any two of the light guide structure 22, the light extraction structure 23 and the bonding adhesive 30 is within a preset error range, thereby ensuring that the light does not lose luminous flux due to the difference among refractive indexes of the three.

In an embodiment, the display module is applied to a transparent display. The light-emitting module 20 functions as an auxiliary display in the transparent display. When the ambient light intensity is low, the light-emitting module 20 is turned on to assist the display module to achieve display. Applying the display module provided by the embodiments of the present disclosure to a transparent display can enhance the display effect of a picture in a transparent screen, and at the same time ensure that the brightness of the display picture is uniform.

According to another aspect of the embodiments of the present disclosure, there is provided a display device. The display device includes the display module according to any one of the foregoing embodiments or the arrangement and combination of the embodiments. In an embodiment, the display device is a transparent display.

It should be noted that the display device in the present embodiment may be any product or component having a display function, such as electronic paper, mobile phone, tablet computer, television, notebook computer, digital photo frame, and navigator.

It can be seen from the above embodiments that, the display device provided by the embodiments of the present disclosure allows the light emitted by the light source to be totally reflected in the light guide structure through the design of the light guide structure, and introduces the light into the display panel by providing the light extraction structure between the light guide structure and the display panel, so as to achieve the display. Because the light extraction structure is provided between the light guide structure and the display panel, whatever the shape of the display panel presents, positioning of the light extraction structure can be adjusted to introduce light into the display panel at any parts of the light guide structure, so as to achieve uniform lighting in the display panel, but also allows the display panel to be made into any shape, which enriches the shape design of the display panel.

Figure 11:
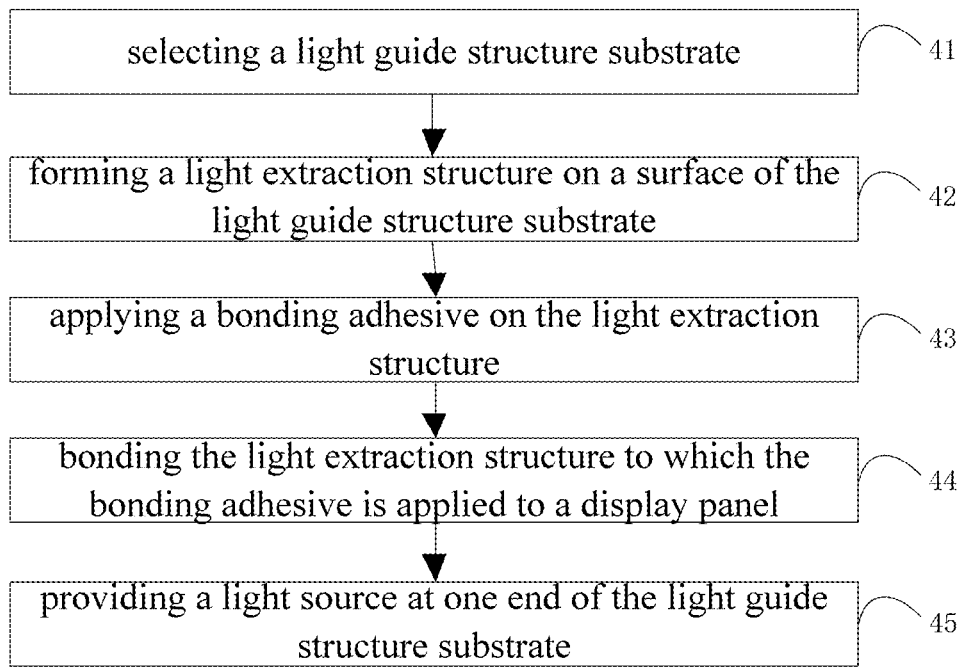
FIG. 11 is a schematic flow diagram showing a method of manufacturing a display module according to an embodiment of the present disclosure.

According to still another aspect of the embodiments of the present disclosure, there is provided a method of manufacturing a display module. FIG. 11 is a schematic flow diagram showing a method of manufacturing a display module according to an embodiment of the present disclosure.

The method of manufacturing a display module comprises the following steps.

Step 41 is to select a light guide structure substrate 22'. In an embodiment, the light guide structure substrate is made of flexible substrate.

Figure 12:
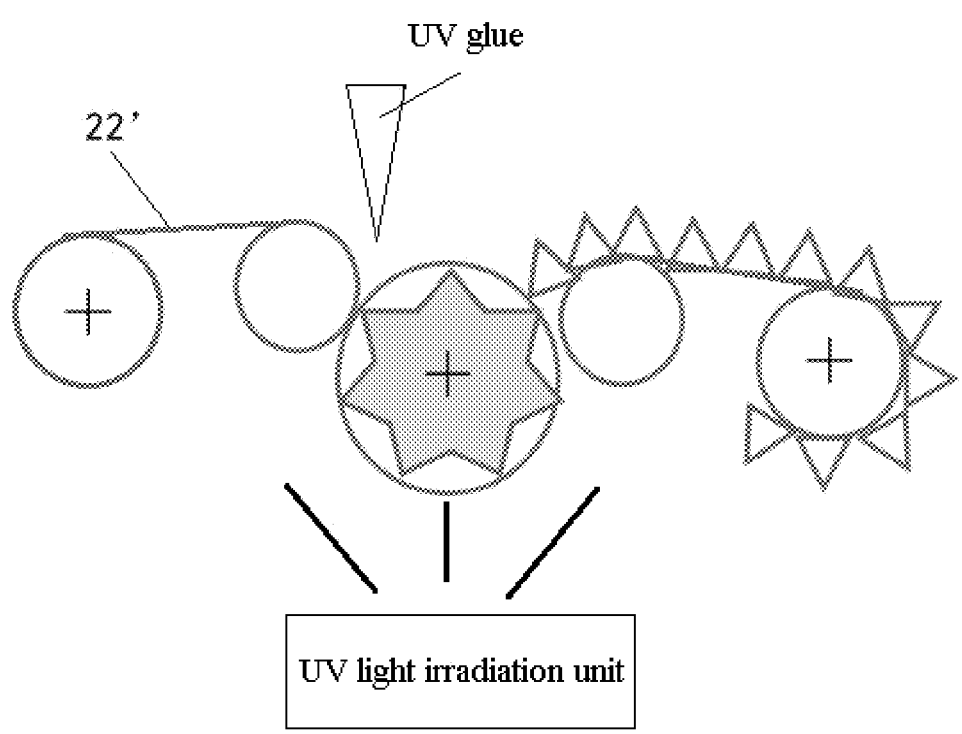
FIG. 12 is a schematic view showing provision of a light extraction structure on a light guide structure substrate according to an embodiment of the present disclosure.

Step 42 is to form a light extraction structure 23 on a surface of the light guide structure substrate 22'. As shown in FIG. 12, when the light extraction structure 23 is a microstructure 231, a UV glue can be used to form the microstructure 231. For example, the UV glue is dripped onto the light guide structure substrate 22', and a UV light irradiation unit is arranged below to cure the UV glue. In addition, an etching process can be used to form the light extraction structure 23 on one side surface of the light guide structure substrate 22'.

Step 43 is to apply a bonding adhesive 30 on the light extraction structure 23. In an embodiment, the bonding adhesive 30 may be provided with a backing film. When needed, the bonding adhesive 30 can be bonded to the display panel 10 after the backing film is peeled off.

Step 44 is to bond the light extraction structure to which the bonding adhesive is applied to the display panel.

Step 45 is to provide a light source 21 at one end of the light guide structure substrate 22', so that the light source 21 and the end face of the light guide structure substrate 22' are accurately aligned.

In addition, the forgoing method of manufacturing a display module may further comprise the following additional step of: providing a reflective structure at an end face of the other end of the light guide structure substrate 22'. In addition, the forgoing method of manufacturing a display module may further comprise the following additional step of: forming a light exit surface at a part of the light guide structure substrate 22' facing the display panel 10, and forming a light reflecting layer at a part of the light guide structure substrate 22' not facing the display panel 10.

It can be seen from the above embodiments that, the display module achieved by the method of manufacturing a display module provided by the embodiments of the present disclosure allows the light emitted by the light source to be totally reflected in the light guide structure through the design of the light guide structure, and introduces the light into the display panel by providing the light extraction structure between the light guide structure and the display panel, so as to achieve the display. Because the light extraction structure is provided between the light guide structure and the display panel, whatever the shape of the display panel presents, positioning of the light extraction structure can be adjusted to introduce light into the display panel at any parts of the light guide structure, so as to achieve uniform lighting in the display panel, but also allows the display panel to be made into any shape, which enriches the shape design of the display panel.

Those of ordinary skill in the art should understand that the above are only specific embodiments of the present disclosure and are not intended to limit the present disclosure. Any modification, equivalent replacement, improvement or the like made within the spirit and principle of the present disclosure should all be included in the protection scope of this disclosure.

What is claimed is:

1. A display module comprising:
a display panel; and
a light-emitting module comprising:
   a light source configured to emit light; and
   a light guide structure configured to form a total reflection propagation of the light emitted by the light source therein; and
a light extraction structure disposed between the display panel and the light guide structure, and configured to introduce the light propagating in the light guide structure into the display panel;
wherein the light guide structure surrounds an outer edge of the display panel, and
wherein the light guide structure comprises a first end provided with the light source, and a second end provided with a reflective structure at an end face thereof.

2. The display module of claim 1, wherein the light extraction structure comprises a plurality of microstructures arranged along a propagation direction of the light in the light guide structure, and a contact area between each microstructure and the light guide structure is smaller than a contact area between the each microstructure and the display panel.

3. The display module of claim 2, wherein along the propagation direction of the light in the light guide structure, a distribution density of the microstructures increases as a distance of the microstructures from the light source increases.

4. The display module of claim 3, wherein the distribution density of the microstructures meets parameter conditions obtained by the following method steps of:
determining a perimeter of the display panel and the number of the microstructures;
obtaining N partitions of the light guide structure by dividing the perimeter into N equal parts;
determining a total luminous flux to be extracted by the microstructures according to a luminous flux of the light source;
calculating the number of microstructures in each partition of the light guide structure and a luminous flux in the each partition according to the number of the microstructures, the total luminous flux to be extracted by the microstructures, and a value of the N; and
calculating a pitch of the microstructures in the each partition according to the number of microstructures in the each partition and the luminous flux in the each partition.

5. The display module of claim 2, wherein a shape of each of the microstructures comprises at least one of the following: a cone, a truncated cone, a spherical segment, a spherical table, an ellipsoidal segment, an ellipsoidal table, or a hyperboloid body truncated at any point by a plane parallel to a base surface.

6. The display module of claim 1, wherein along a light exit direction of the display panel, a height of the light guide structure is smaller than a thickness of the display panel.

7. The display module of claim 6, wherein along the light exit direction of the display panel, a width of a contact surface between the light extraction structure and the light guide structure is the same as the height of the light guide structure, and a width of a contact surface between the light extraction structure and the display panel is the same as the thickness of the display panel.

8. The display module of claim 1, wherein a light exit surface is formed at a part of the light guide structure facing the display panel, and a light reflecting layer is formed at a part of the light guide structure not facing the display panel.

9. The display module of claim 1, wherein a wedge-shaped light incident structure is provided between the light source and the first end.

10. The display module of claim 1, wherein the light guide structure is made of a flexible material.

11. The display module of claim 1, wherein a surface of the light extraction structure in contact with the display panel is bonded to the display panel by a bonding adhesive.

12. The display module of claim 11, wherein refractive indices of the light guide structure, the light extraction structure and the bonding adhesive are substantially equal, or a difference between the refractive indices of any two of the light guide structure, the light extraction structure and the bonding adhesive is within a preset error range.

13. The display module of claim 1, wherein the display module is applied to a transparent display.

14. The display module of claim 13, wherein:
the light extraction structure comprises a plurality of microstructures arranged along a propagation direction of the light in the light guide structure, and a contact area between each microstructure and the light guide structure is smaller than a contact area between the each microstructure and the display panel; and
the display module is applied to a polymer network liquid crystal transparent display, and a side surface of each of the microstructures is configured such that reflection angles formed by parallel light incident from any angle on each of the microstructures at at least two parts of the side surface of the each of the microstructures are different.

15. A display device comprising the display module of claim 1.

16. The display device of claim 15, wherein the light extraction structure includes a plurality of microstructures arranged along a propagation direction of the light in the light guide structure, and a contact area between each microstructure and the light guide structure is smaller than a contact area between the each microstructure and the display panel.

* * * * *